(12) United States Patent
Oh et al.

(10) Patent No.: US 8,035,495 B2
(45) Date of Patent: Oct. 11, 2011

(54) REAR VIEW MIRROR, MONITORING APPARATUS AND MONITORING METHOD

(75) Inventors: Myong Rock Oh, Suwon-si (KR); Jin Soo Chung, Ansna-si (KR)

(73) Assignee: LG Innotek Co., Ltd., Seoul (KR)

( * ) Notice: Subject to any disclaimer, the term of this patent is extended or adjusted under 35 U.S.C. 154(b) by 275 days.

(21) Appl. No.: 12/439,272

(22) PCT Filed: Aug. 17, 2007

(86) PCT No.: PCT/KR2007/003932
§ 371 (c)(1),
(2), (4) Date: Feb. 27, 2009

(87) PCT Pub. No.: WO2008/026842
PCT Pub. Date: Mar. 6, 2008

(65) Prior Publication Data
US 2010/0001850 A1     Jan. 7, 2010

(30) Foreign Application Priority Data
Aug. 29, 2006   (KR) .................. 10-2006-0082039

(51) Int. Cl.
*B60Q 1/00*       (2006.01)
(52) U.S. Cl. ........ 340/438; 340/435; 340/436; 340/901; 340/425.5; 348/148; 345/173; 345/174; 345/175

(58) Field of Classification Search .................. 340/438, 340/435, 436, 901, 425.5; 348/148; 345/173, 345/174, 175
See application file for complete search history.

(56) References Cited

U.S. PATENT DOCUMENTS

| | | | |
|---|---|---|---|
| 6,642,840 B2 | 11/2003 | Lang et al. | |
| 7,050,089 B2 * | 5/2006 | Nakamura | 348/148 |
| 7,136,091 B2 * | 11/2006 | Ichikawa et al. | 348/148 |

FOREIGN PATENT DOCUMENTS

| | | |
|---|---|---|
| CN | 2541263 Y | 3/2003 |
| KR | 10-2000-0053567 | 8/2000 |
| KR | 10-2005-0018566 | 2/2005 |
| KR | 10-0581317 | 5/2006 |
| KR | 10-0613471 | 8/2006 |

OTHER PUBLICATIONS

Office Action dated Feb. 23, 2011 in Chinese Application No. 200780036193.4, filed Aug. 17, 2007.

* cited by examiner

*Primary Examiner* — Tai T Nguyen
(74) *Attorney, Agent, or Firm* — Saliwanchik, Lloyd & Eisenschenk

(57) ABSTRACT

The embodiment relates to a rear view mirror, a monitoring apparatus and a monitoring method. The monitoring apparatus comprises a mirror for showing an object; a camera module obtaining image data from the object and processing the image data; and a display module for displaying the image data processed by the camera module.

16 Claims, 3 Drawing Sheets

[Fig. 1]
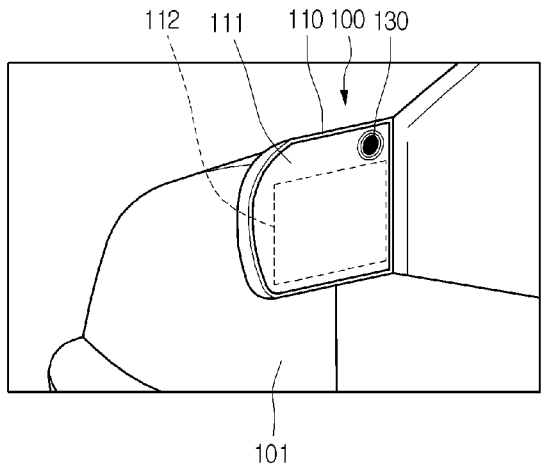
[Fig. 2]
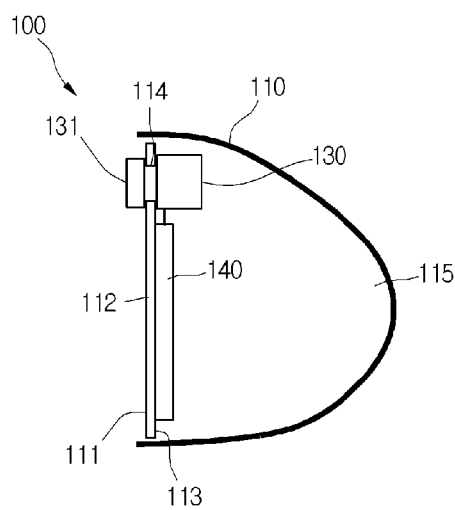
[Fig. 3]
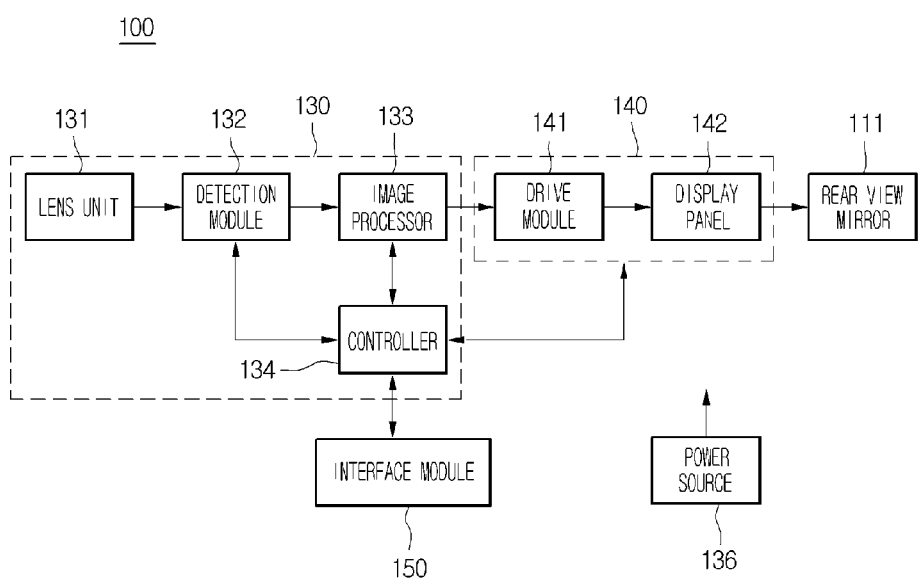

[Fig. 4]
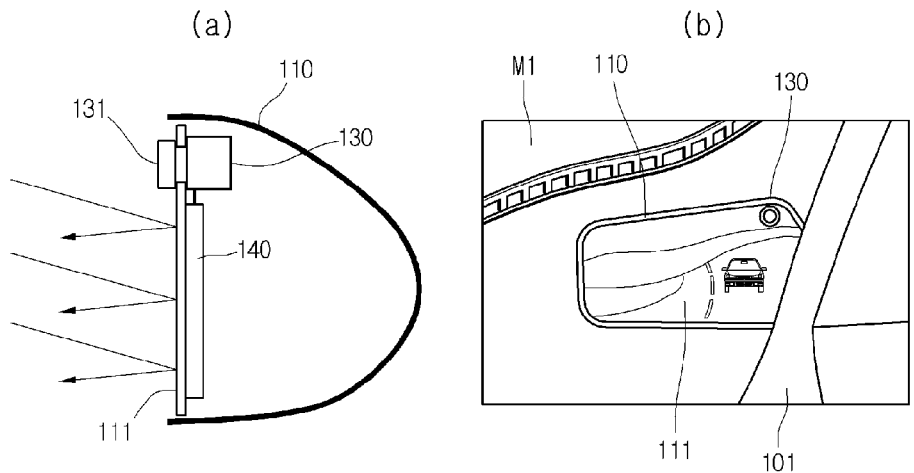
[Fig. 5]
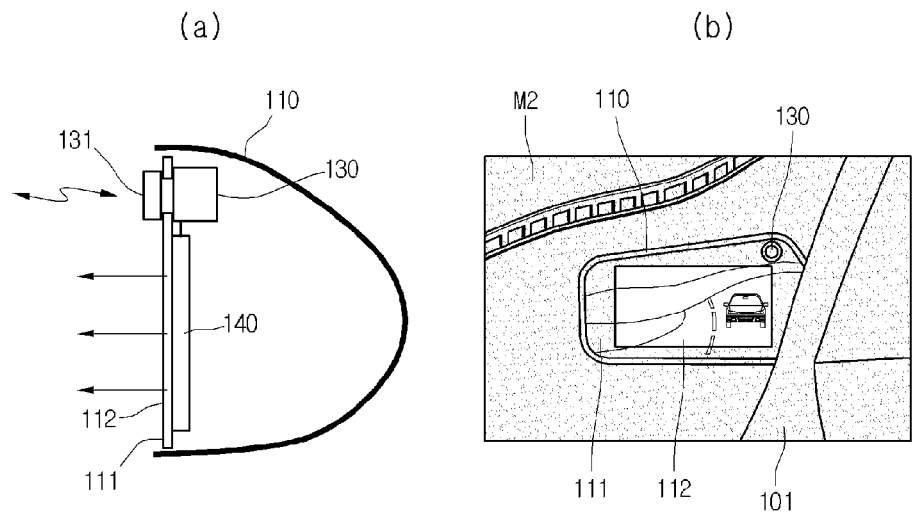
[Fig. 6]
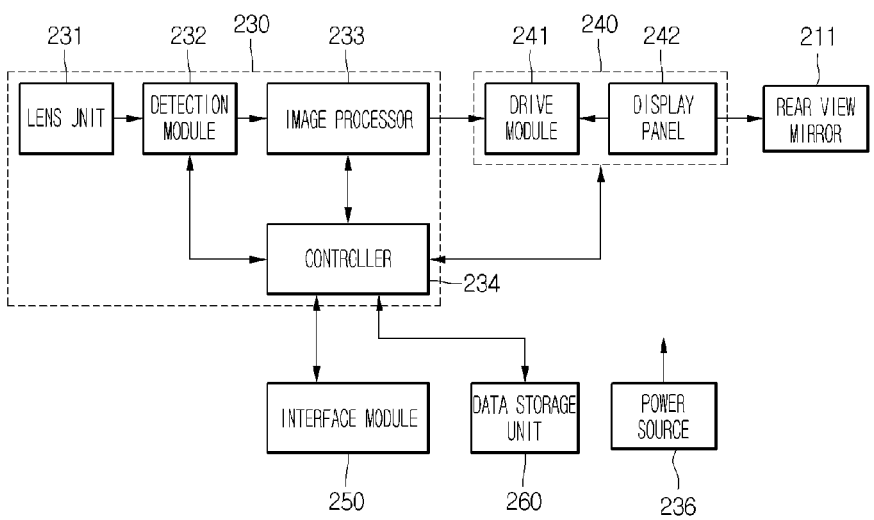

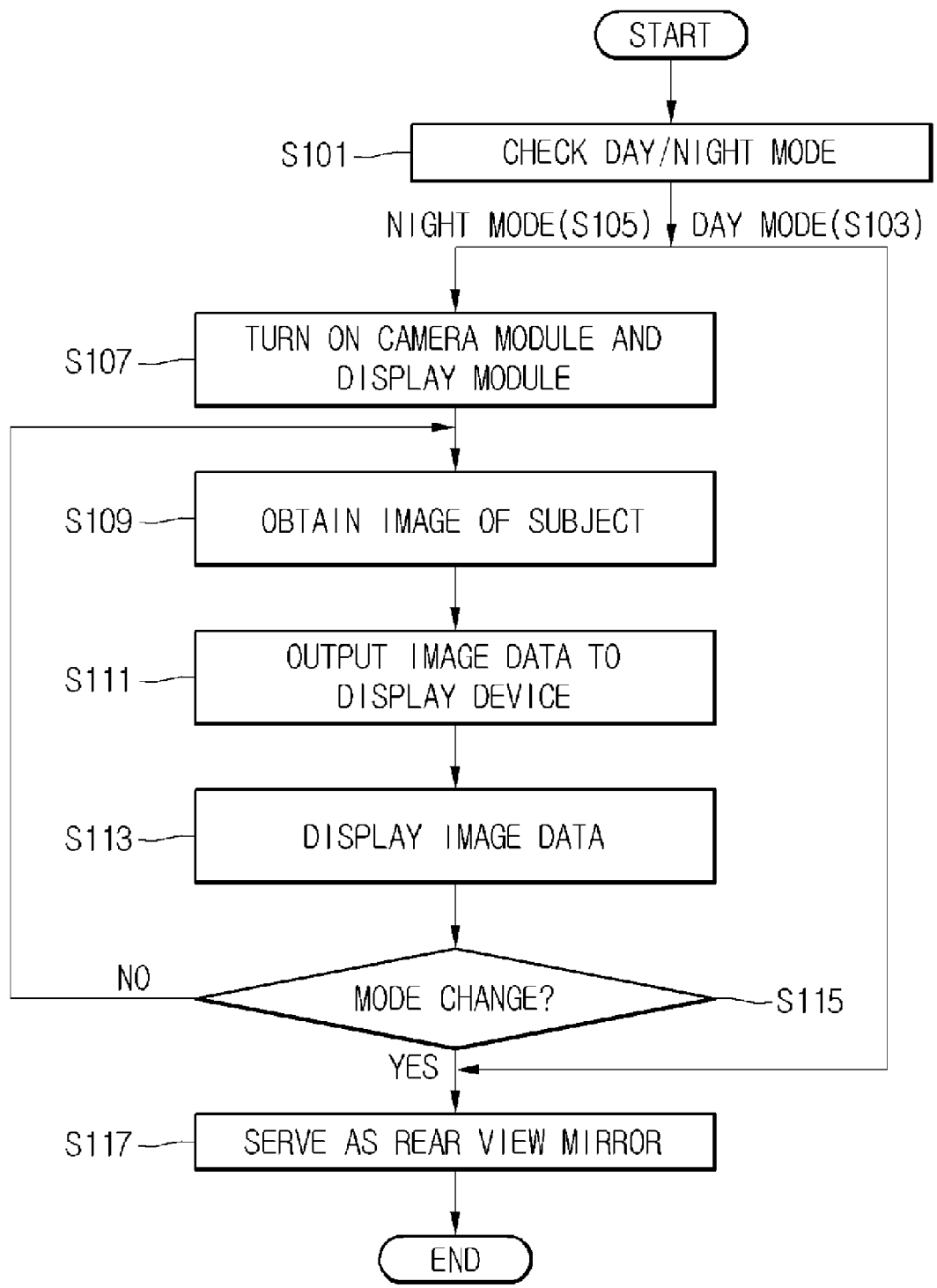

REAR VIEW MIRROR, MONITORING APPARATUS AND MONITORING METHOD

CROSS-REFERENCE TO RELATED APPLICATION

This application is the U.S. national stage application of International Patent Application No. PCT/KR2007/003932, filed Aug. 17, 2007, the disclosure of which is hereby incorporated by reference in its entirety.

TECHNICAL FIELD

Embodiments relate to a rear view mirror, a monitoring apparatus, and a monitoring method.

BACKGROUND ART

Generally, a vehicle is equipped with two external rear view mirrors and one internal rear view mirror to allow a driver to recognize the situation behind the vehicle. The external rear view mirrors are installed at left and right sides of the vehicle to show the objects appearing behind the left and right sides of the vehicle. The internal rear view mirror is installed in the vehicle to show the objects appearing behind the vehicle. A driver can freely adjust the tilting angle of the rear view mirrors, but the rear view mirrors locally show the region behind the vehicle.

In addition, when monitoring the rear region using the rear view mirrors while driving the vehicle at night, the driver may not easily recognize the traffic situation and the shape of the object appearing behind the vehicle. In this case, the driver may feel inconvenienced.

DISCLOSURE OF INVENTION

Technical Problem

An embodiment provides a rear view mirror, a monitoring apparatus, and a monitoring method, capable of allowing the driver to recognize the situation behind the vehicle by using the rear view mirror and a camera.

An embodiment provides a rear view mirror, a monitoring apparatus, and a monitoring method, capable of displaying objects appearing behind the vehicle by detecting the objects using the rear view mirror, an infrared camera and a display module.

In addition, the embodiment provides a rear view mirror, a monitoring apparatus, and a monitoring method, capable of displaying data requested by a user in a display device installed in the rear view mirror.

Technical Solution

An embodiment provides monitoring apparatus, comprising: a mirror for showing an object; a camera module obtaining image data from the object and processing the image data; and a display module for displaying the image data processed by the camera module.

An embodiment provides rear view mirror, comprising: a trans-reflective mirror showing an object appearing in a rear region and being protected by a case; a camera module at a corner of the trans-reflective mirror to obtain image data from the object appearing in the rear region; and a display module behind the trans-reflective mirror to display the image data through the trans-reflective mirror.

An embodiment provides monitoring method, comprising the steps of: obtaining image data of a subject through a camera module; processing the image data and outputs the processed image data to a display module behind a trans-reflective region of a rear view mirror; displaying the image data through the display module and the rear view mirror.

Advantageous Effects

According to the rear view mirror, monitoring apparatus and monitoring method, the objects appearing behind the vehicle can be clearly displayed on the rear view mirror at night as well as in the daytime.

In addition, since the objects appearing behind the vehicle can be clearly displayed by means of the infrared camera, the driver can conveniently drive the vehicle at night.

Furthermore, the rear view mirror can be installed in a movable member or a fixed member to provide traffic information or to monitor facilities.

BRIEF DESCRIPTION OF THE DRAWINGS

FIG. 1 is a view showing a monitoring apparatus using a rear view mirror for a vehicle according to an embodiment;

FIG. 2 is a side sectional view of a rear view mirror for a vehicle according to an embodiment;

FIG. 3 is a block diagram showing a monitoring apparatus according to an embodiment;

FIG. 4 is a view showing the operational state of a monitoring apparatus using a rear view mirror in the daytime;

FIG. 5 is a view showing the operational state of a monitoring apparatus using a rear view mirror at night;

FIG. 6 is a block diagram showing a monitoring apparatus according to another embodiment; and FIG. 7 is a flowchart showing the monitoring method using a rear view mirror according to an embodiment.

BEST MODE FOR CARRYING OUT THE INVENTION

Hereinafter, embodiments will be described with reference to the accompanying drawings.

FIG. 1 is a view showing a monitoring apparatus using a rear view mirror for a vehicle according to an embodiment, and FIG. 2 is a side sectional view of a rear view mirror for a vehicle according to an embodiment.

Referring to FIG. 1, a vehicle 101 is equipped with various mirrors, such as rear view mirrors (or rear mirrors) 111, for monitoring the region behind the vehicle or the dead angle region. For instance, the rear view mirror 111 may include left/right external rear view mirrors, an internal rear view mirror, and an auxiliary rear view mirror. The external rear view mirrors are installed near the left and right front doors of the vehicle to show the objects appearing in the rear region, and the internal rear view mirror is installed in the vehicle to show the object appearing behind the vehicle. The auxiliary rear view mirror shows the objects positioned in the specific region, which is not detected by the left/right external rear view mirrors and the internal rear view mirror. Among the above rear view mirrors, the following description relates to the left external rear view mirror.

The left external rear view mirror 111 (hereinafter, simply referred to as a rear view mirror) is protected by a mirror case 110. The mirror case 110 has a contour designed to protect the rear view mirror 111. All elements or some elements of a monitoring apparatus 100 are provided in the mirror case 110.

Referring to FIGS. 1 and 2, the monitoring apparatus 100 includes the rear view mirror 111, a camera module 130 and a display module 140. The rear view mirror 111 may realize a trans-reflective mirror, which is formed over the whole area or a predetermined area of the rear view mirror 111. The rear view mirror 111 is installed at the left side of the vehicle 101 to show the objects appearing in the rear region. An image display area 112 is provided in a transmission region of the rear view mirror 111 to display image data of the monitoring apparatus 100. The rear view mirror 111 has a foldable structure, so that the user can adjust the angle of the rear view mirror 111.

The camera module 130 is installed at the corner of the rear view mirror 111. The photographing angle of the camera module 130 can be adjusted according to the tilting angle of the rear view mirror 111. A lens unit 131, which is provided at one end of the camera module 130, is exposed to the exterior at the front of the rear view mirror 111 to ensure the field of vision.

The camera module 130 is coupled into a camera fixing hole 114 formed in the rear view mirror 111. The camera module 130 is integrally coupled with the rear view mirror 111, so that it is not necessary to separately install a tool for adjusting the photographing angle of the camera module 130.

The camera module 130 has a zoom in/out function, so the user can deal with the camera module 130 using the zoom in/out function. The camera module 130 can be provided with a fixing unit, which is prepared in the form of hardware and/or software in order to prevent the camera module 130 from being shaken. In this case, the camera module 130 can provide clear image data.

The camera module 130 can be realized in the form of an infrared camera. The infrared camera detects a subject by using a temperature sensor or an infrared sensor.

The camera module 130 is electrically connected with the display module 140 and the data obtained by the camera module 130 are displayed on the display module 140.

The display module 140 is coupled to a rear portion of the image display area 112. For instance, the display module 140 includes a thin display device, such as an LCD, and displays the image data obtained from the camera module 130. The image data are displayed through the image display area 112 of the rear view mirror 111.

The display module 140 and the camera module 130 may operate when external environment is dark (for instance, at night). According to the embodiment, both the camera module 130 and the display module 140 are installed in the rear view mirror 111. However, only the camera module 130 can be installed in the rear view mirror 111 while installing the display module 140 in the other region, or vice versa.

FIG. 3 is a block diagram showing the monitoring apparatus according to the embodiment.

Referring to FIG. 3, the monitoring apparatus 100 includes the camera module 130 and the display module 140. In addition, the monitoring apparatus 100 may further include an interface module 150 and a power source 136, if necessary.

The camera module 130 includes a lens unit 131, a detection unit 132, an image processor 133 and a controller 134. The lens unit 131 has at least one lens for adjusting the focal length. The detection unit 132 obtains the image data by detecting the infrared ray or the temperature of the subject. For instance, the detection unit 132 generates the electric signal by detecting the temperature or heat generated from the subject, or generates the electric signal by detecting the infrared ray that is irradiated onto the subject from an infrared ray lamp and reflected from the subject.

The image processor 133 converts the detected electric signal into digital image data. The image processor 133 can extract image data corresponding to the display area from the rear region.

The controller 134 controls the operation of the above components. Especially, the controller 134 controls the display module 140 to display the image data. The camera module 130 may include a memory that temporarily stores the image data to be output to the display module 140.

The controller 134 makes communication with the system of the vehicle or the external host, and turns on/off the camera module 130 and the display module 140. In addition, the controller 134 controls the camera module 130 and the display module 140 according to the signals, which are input into or output from the controller 134 through the interface module 150.

The controller 134 checks the intensity of external light (for example, solar light), which is detected by an illumination sensor (not shown) installed in the vehicle, to turn on/off the monitoring apparatus 100. That is, the controller 134 turns on the camera module 130 and the display module 140 of the monitoring apparatus 100 when the intensity of the external light is less than a predetermined level. Thus, the image data detected by the camera module 130 are displayed through the display module 140 and the rear view mirror 111.

In addition, the controller 134 can turn on/off the monitoring apparatus 100 according to the on/off state of the headlight of the vehicle. That is, if the headlight is turned on, the monitoring apparatus 100 is also turned on. Therefore, the image data detected by the camera module 130 are displayed through the display module 140 and the rear view mirror 111.

If the headlight is turned off or the intensity of the external light exceeds the predetermined level, the camera module 130 and the display module 140 are turned off. In this case, the rear view mirror 111 simply shows the objects appearing in the rear region.

The display module 140 includes a drive unit 141 and a display panel 142. The drive unit 141 drives the display panel 142 according to the image data. For instance, the display panel 142 includes a liquid crystal panel or an organic light emitting diodes panel that displays the image data. Thus, the image data detected by the camera module 130 are displayed through the display panel 142 and the rear view mirror 111.

In addition, the controller 134 controls the power source 136 to control power supplied to the camera module 130 and the display module 140.

FIG. 4 is a view showing the operational state of the monitoring apparatus using the rear view mirror in the daytime. As shown in FIG. 4, the camera module 130 and the display module 140 are turned off in the daytime M1, so the rear view mirror 111 simply shows the objects appearing in the rear region.

FIG. 5 is a view showing the operational state of the monitoring apparatus using the rear view mirror at night. As shown in FIG. 5, the camera module 140 and the display module 140 are turned on at night M2, so the image data detected by the camera module 130 is displayed through the display module 140. The output data of the display module 140 is exposed to the exterior through the rear view mirror 111, that is, the image data are displayed on the rear view mirror 111.

Such a monitoring apparatus 100 employing the rear view mirror 111 is adaptable for various mirrors of the vehicle 111, such as automobiles. Especially, the subject photographed by the camera module 130 can be displayed through the rear view mirror 111 at night. In addition, the monitoring apparatus 100 can be installed in the fixed member to provide traffic information or to monitor facilities.

FIG. 6 is a block diagram showing the monitoring apparatus according to another embodiment. In the following description, the elements identical to those of shown in FIG. 3 will not be further described in order to avoid redundancy.

Referring to FIG. 6, the monitoring apparatus 200 includes a camera module 230, a display module 240 and a data storage unit 260. The monitoring apparatus 200 is turned on at night (night mode), so the image data of the subject photographed by the camera module 230 are displayed through the display module 240 and the rear view mirror.

The data storage unit 260 can store image data, which are input thereto from a lens unit 231 and a detection unit 232, and an image processor 233 of the camera module 230. The stored data can be output through a drive unit 241 and a display panel 242 as requested by the user.

In the user mode, the controller 234 downloads the image data (for example, moving picture files, image files and the like) stored in the data storage unit 260, and the downloaded data are output through the display module 240. Thus, the user can view the image data displayed on the rear view mirror 111. If there are audio data, the controller 234 may output the audio data by controlling the speaker of the system through an interface module 250. Such a user mode can be adopted when the vehicle engine stops its operation.

FIG. 7 is a flowchart showing the monitoring method using the rear view mirror according to an embodiment.

Referring to FIG. 7, the monitoring apparatus checks whether the vehicle is in the day mode or the night mode (S101).

If the vehicle is in the day mode (S103), the rear view mirror simply serves as a mirror (S117).

If it is determined in step S101 that the vehicle is in the night mode (S105), the camera module and the display module provided in the rear view mirror are turned on (S107). Thus, the camera module obtains the image data of the subject positioned behind the vehicle (S109), and outputs the image data to the display module (S111).

The image data output from the display module is displayed on the rear view mirror (S113). Thus, the subject can be clearly shown in the rear view mirror at night (night mode).

Then, the controller checks where the night mode is changed. If there is no mode change, step S109 is performed. If the night mode is changed, step S117 is performed. The mode change may occur when the external environment is changed from night to day or vice versa, when the supply power is shut off, or when the user manually converts the mode.

In step S117, the rear view mirror of the monitoring apparatus simply serves as a mirror due to the mode change from the night mode to the day mode, shut-off of supply power, or manual mode change by the user.

In the above embodiment, the monitoring apparatus is turned on/off according to the turn on/off state of the headlight or the intensity of the solar light. However, the monitoring apparatus can be turned on/off by means of a switch, which is additionally installed to the movable member or the fixed member.

It will be apparent to those skilled in the art that various modifications and variations can be made in the present invention. Thus, it is intended that the present invention covers the modifications and variations thereof within the scope of the appended claims.

INDUSTRIAL APPLICABILITY

According to the rear view mirror, the monitoring apparatus and the monitoring method of the embodiment, the objects appearing behind the vehicle can be clearly displayed on the rear view mirror at night as well as in the daytime.

In addition, since the objects appearing behind the vehicle can be clearly displayed by means of the infrared camera, the driver can conveniently drive the vehicle at night.

Furthermore, the rear view mirror can be installed in a movable member or a fixed member to provide traffic information or to monitor facilities.

The invention claimed is:

1. A monitoring apparatus comprising:
    a mirror for showing an object according to a turn off state of a headlight;
    a camera module having an infrared camera installed in the mirror and obtaining image data from the object and processing the image data; and
    a display module having a display panel located behind the mirror for displaying the image data processed by the camera module,
    wherein the camera module and the display module are turned on according to a turn on state of the headlight, and display the image data through the mirror.

2. The monitoring apparatus as claimed in claim 1, wherein the mirror comprises at least one of mirrors installed at internal and external portions of a movable member and a mirror installed at a fixed member.

3. The monitoring apparatus as claimed in claim 1, wherein the mirror comprises a trans-reflective area for displaying the image data of the display module, and the display module is behind the trans-reflective area.

4. The monitoring apparatus as claimed in claim 1, wherein the camera module comprises an infrared camera installed in the mirror or at an outer portion of the mirror.

5. The monitoring apparatus as claimed in claim 1, wherein the camera module comprises a detection unit for detecting a subject by irradiating infrared ray onto the subject, and an image processor that processes the image data detected by the detection unit and outputs the processed image data to the display module.

6. The monitoring apparatus as claimed in claim 5, wherein the camera module comprises a controller that controls operations and power supply of the detection unit, the image processor and the display module while serving as an interface to an external apparatus.

7. The monitoring apparatus as claimed in claim 1, wherein the camera module comprises a lens unit comprising at least one lens.

8. The monitoring apparatus as claimed in claim 1, wherein the display module comprises a drive unit for driving the display panel.

9. The monitoring apparatus as claimed in claim 1, comprising an illumination sensor for turning on/off the camera module and the display module according to intensity of solar light.

10. The monitoring apparatus as claimed in claim 1, comprising a data storage unit for storing the image data.

11. The monitoring apparatus as claimed in claim 10, wherein the camera module displays the image data photographed by the camera module or the image data stored in the data storage unit.

12. The monitoring apparatus as claimed in claim 10, wherein a photographing angle of the camera module is adjustable according to an angle of the mirror.

13. A rear view mirror comprising:
    a trans-reflective mirror showing an object appearing in a rear region according to a turn off state of a headlight and being protected by a case;

a camera module having an infrared camera at a corner of the trans-reflective mirror to obtain image data from the object appearing in the rear region; and a display module behind the trans-reflective mirror to display the image data through the trans-reflective mirror, wherein the camera module and the display module are turned on according to a turn on state of the headlight, and display the image data through the mirror.

14. The rear view mirror as claimed in claim 13, comprising a controller making communication with a host and controlling turn on/off operations of the camera module and the display module in a day mode or a night mode.

15. The rear view mirror as claimed in claim 13, wherein the rear view mirror comprises at least one of rear view mirrors installed at internal and external portions of a movable member and a rear view mirror installed at a fixed member.

16. The rear view mirror as claimed in claim 13, wherein the camera module comprises a detection unit for detecting a subject by irradiating infrared ray onto the subject, and an image processor that processes the image data detected by the detection unit and outputs the processed image data to the display module, and the display module comprises an LCD module displaying the image data through the rear view mirror and a drive unit for driving the LCD module.

* * * * *